April 21, 1931.          G. W. BOWER          1,802,046
CATENARY TROLLEY SYSTEM
Filed Oct. 11, 1928
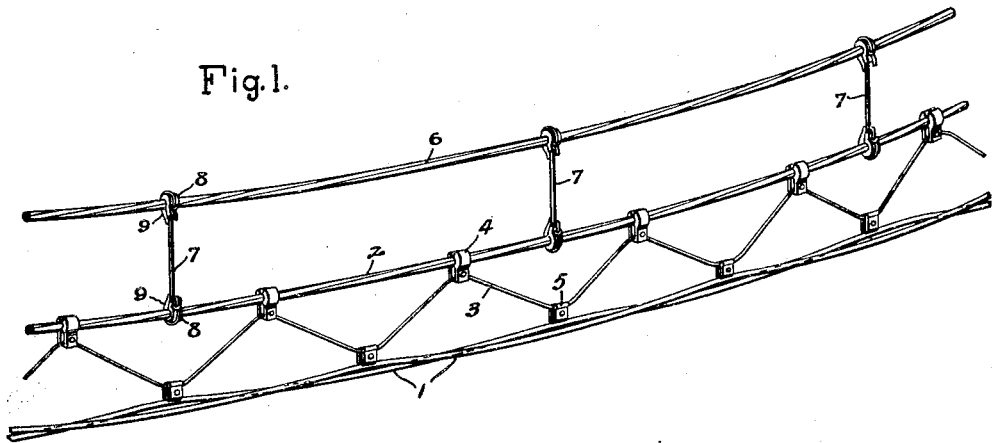
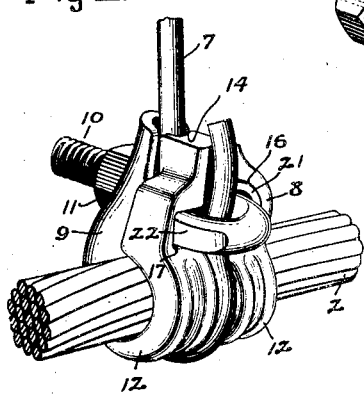
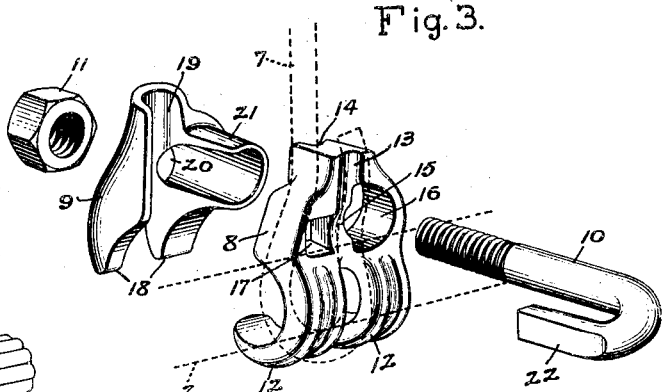
Inventor:
George W. Bower,
by Charles E. Tullar
His Attorney.

Patented Apr. 21, 1931

1,802,046

UNITED STATES PATENT OFFICE

GEORGE W. BOWER, OF WESLEYVILLE, PENNSYLVANIA, ASSIGNOR, BY MESNE ASSIGN-
MENTS, TO THE OHIO BRASS COMPANY, A CORPORATION OF NEW JERSEY

CATENARY TROLLEY SYSTEM

Application filed October 11, 1928. Serial No. 311,921.

The present invention relates to overhead trolley wire systems for electric railways, and more especially to the catenary type of such systems.

The object of my invention is the provision of improved means for attaching and suspending the trolley wires or current-supply wires from the supporting catenary cable which may be easily and securely installed and which may be produced economically.

One embodiment of the invention is shown in the accompanying drawing, in which Fig. 1 is a perspective view of a fragmentary span of a catenary system in general use at the present time on electrified steam railways and having my improved connecting means applied thereto; Fig. 2 is a similar view of the clamp for connecting a wire dropper to a cable, and Fig. 3 is a corresponding view of the clamp with its parts disassembled.

As indicated in Fig. 1, there are two trolley wires 1 electrically and yieldably connected to a parallel feeder cable 2 by a flexible lacing wire or cable 3 attached to the feeder cable 2 at spaced intervals and alternately to the respective trolley wires at like intervals by ears or clamps 4 and 5. The feeder cable 2 and the parts carried thereby are supported, parallel to the railway tracks, by hangers or droppers from the steel catenary cable 6 which is carried on supports (not shown) located more than a hundred feet apart. On account of the trolley wires 1 and the feeder cable 2 being stretched substantially straight while the spans of the supporting cable 6 are substantially catenary curves, the vertical distance between the two cables varies from point to point. Accordingly the hangers or droppers between the two cables 2 and 6 must have a variety of lengths. Furthermore, in installing of an overhead trolley line, there is always necessarily more or less adjustment of connections to accurately position the trolley wires relative to the road bed.

It has been the practice heretofore either to provide a multiplicity of connections or droppers of differing lengths or else to provide the connectors or droppers with means for adjusting the lengths thereof. According to my invention, the main portion of the connectors or droppers is made from continuous lengths of ordinary round wire 7, and only after a dropper has been bent about the cable or else bent and permanently clamped in final position is it severed from the supply coil.

My means for clamping the dropper wire 7 to the cables comprises two jaw members 8 and 9, a U bolt 10 and nut 11.

The main or front jaw member 8 has at its lower end two jaws 12 spaced apart sufficiently to admit the dropper wire 7 between them and transversely curved through a semicircle to provide a bearing surface for reception of the cable. On opposite sides of the upper end of the jaw member are vertical grooves 13 and 14 to provide seats for the dropper wire 7. The outer grove 13 has a central depression 15 into which the wire 7 is drawn by the U bolt 10. Extending through the upper end of the member and on opposite sides of the grooves 13 and 14 are two apertures 16 and 17 for the transverse passage therethrough of the bolt 10. The aperture 16 is cylindrically enlarged and the aperture 17 is made rectangular for a purpose to be set forth.

The rear jaw member 9 has at its lower end two jaws 18 also curved to engage the surface of a cable, but somewhat shorter than the jaws 12 of the other member and a vertical groove 19 extends the length of the inner surface thereof for the reception of the wire 7. In the upper end of the member 9 and to one side of the groove 19 is a transverse aperture 20 for the passage therethrough of the bolt 10, and projecting from the inner surface of the member is a semicylindrical flange 21 about the aperture 20 adapted to fit easily within the correspondingly-shaped aperture 16 of the other jaw member 8 and serve to align the two members.

The U bolt 10 has its shank threaded for the reception of the nut 11 and its hooked end 22 is somewhat flattened to enter the rectangular aperture 17 in the jaw member 8.

To install the dropper or hanger, one end of a continuous length of wire is bent hook shape, and engaged with one of the cables 2 or 6 the main jaw member 8 is slipped into position, the other jaw member 9 is positioned so that its flange 21 enters the aperture 16 of the other member, the shank of the U bolt 10 is passed through apertures 16 and 20 and the nut 11 turned home. As the U bolt is drawn inwardly, its hooked end enters the aperture 17 and the bent end of the wire 7 is caught in the hook 22 thereof and depressed into the recess 15. The length of wire 7 is then passed about the outer cable and bent thereabout at a point determined by the distance apart it is desired to hold the two cables 2 and 6, and after screwing home of a clamp thereon the wire 7 is severed, as indicated in Fig. 2.

While I have shown and described the best embodiment of the invention known to me, I do not desire to be restricted thereto.

What I claim as new and desire to secure by Letters Patent of the United States, is:

1. A dropper for trolley wire systems having a catenary suspension cable, comprising a wire adapted to be hooked about the cable and a clamp for fastening the hooked end of said wire to said cable, said clamp consisting of two members each provided with bifurcated jaws adapted to embrace the cable on opposite sides of said wire, and means for forcing said clamping members into fixed engagement with said wire and cable.

2. A dropper for trolley wire systems having a catenary suspension cable, comprising a wire adapted to be hooked about the cable and a clamp for fastening the hooked end of said wire to the cable, said clamp consisting of two cable embracing jaw members having means to hold them in alignment, and a U bolt passing transversely through both members and adapted to bind the wire to and between the said members independently of the cable secured thereby.

3. The combination with two variably spaced cables of a catenary trolley system, of a dropper wire secured at one portion of its length to one of said cables and bent at another portion of its length, according to the desired cable spacing, about the second cable, and a cable embracing clamp for fastening the bent portion of said dropper wire directly against the sides of said second cable.

4. The combination with two variably spaced cables of a catenary trolley system, of a dropper wire secured at one portion of its length to one of said cables and bent at another portion of its length, according to the desired cable spacing, about the second cable, and a cable embracing clamp adapted to bind the bent portion of said dropper wire directly against the sides of said second cable and to firmly grip the free end of said bent dropper wire independently of the cable secured thereby.

In witness whereof, I have hereunto set my hand this 8th day of October 1928.

GEORGE W. BOWER.